United States Patent [19]

Shields et al.

[11] Patent Number: 5,476,540
[45] Date of Patent: Dec. 19, 1995

[54] GEL-FORMING INKS FOR USE IN THE ALLEVIATION OF BLEED

[75] Inventors: James P. Shields, Philomath; John R. Moffatt, Corvallis, both of Oreg.

[73] Assignee: Hewlett Packard Corporation, Palo Alto, Calif.

[21] Appl. No.: 318,581

[22] Filed: Oct. 5, 1994

[51] Int. Cl.$^6$ .......................... C09D 11/02; C09D 11/04; C09D 11/14
[52] U.S. Cl. .................. 106/20 R; 106/22 F; 106/22 H; 106/24 A; 106/25 R; 106/25 A; 106/26 R
[58] Field of Search ................................ 106/20 R, 22 F, 106/22 H, 24 A, 25 R, 25 A, 26 R

[56] References Cited

U.S. PATENT DOCUMENTS

| | | | |
|---|---|---|---|
| 4,938,801 | 7/1990 | Yoshioka et al. | 106/20 R |
| 5,133,803 | 7/1992 | Moffatt | 106/22 F |
| 5,226,957 | 7/1993 | Wickramanayake et al. | 106/22 F |

*Primary Examiner*—Helene Klemanski

[57] ABSTRACT

A method for controlling color bleed between adjacent multi-color ink regions on a print medium is disclosed. Color bleed involves the migration of color agents between adjacent zones in a multicolored printed image on a print medium. A first composition containing a gel-forming species and a color agent is brought into contact on a region of the print medium with a second composition having a color agent and a gel-initiating species or chemical conditions which bring about gelation. In alternative embodiments, the print medium may be pretreated with either a gel-initiating species or a gel-forming species (with no colorant), followed by treatment with a gel-forming species or gel-initiating species (with colorant), respectively. The formation of the gel upon the print medium impedes the movement of the color agent or agents and thus reduces the color bleed between adjacent zones.

20 Claims, No Drawings

GEL-FORMING INKS FOR USE IN THE ALLEVIATION OF BLEED

TECHNICAL FIELD

The present invention relates to inks employed in ink-jet printing, especially in thermal ink-jet printing, and, more particularly, to colored compositions in which color bleed is substantially reduced or even eliminated.

BACKGROUND ART

Heavy dye loads on bond paper of various colored inks can lead to bleed and reduction of waterfastness. Bleed, as used herein, is the invasion of one color into another color on paper or other print medium. This is in contradistinction to uses of the term in the prior art, which tend to define "bleed" in the context of ink of a single color following the fibers of the paper.

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Many inks that are described for use in ink-jet printing are usually associated with non-thermal ink-jet printing. An example of such non-thermal ink-jet printing is piezoelectric ink-jet printing, which employs a piezoelectric element to expel droplets of ink to the medium. Inks suitably employed in such non-thermal applications often cannot be used in thermal ink-jet printing, due to the effect of heating on the composition.

A need remains for compositions for use in ink-jet printing, particularly thermal ink-jet printing, which do not evidence bleed, as defined herein, and yet which possess relatively long shelf life and other desirable properties of such inks.

DISCLOSURE OF INVENTION

In accordance with the present invention, an improved method is provided for printing multi-color images on a print medium in which color bleed between adjacent colored regions is controlled comprising the steps of:

(a) providing two compositions, a first composition comprising a gel-forming species and a second composition comprising a gel-initiating species which is capable of reacting with the first composition in order to form a gel therefrom, provided that at least one of the two compositions includes at least one coloring agent;

(b) applying the first composition to the print medium in a first region thereon;

(c) applying the second composition to the print medium in a second region thereon, the second region being directly adjacent and in contact with the first region: and (d) allowing the gel-initiating species in the second composition to react with the gel-forming species in the first composition at a position on the print medium where the first region comes in contact with the second region so that the gel is formed at the position in order to prevent color bleed between the first composition in the first region and the second composition in the second region.

The inks of the invention evidence little or no color bleed when printed on a print medium and possess relatively long shelf life. The present invention described is also applicable to other ink-jet technologies.

BEST MODES FOR CARRYING OUT THE INVENTION

In accordance with the present invention, a unique and highly effective method for controlling color bleed between adjacent multi-color ink regions on a print medium is described herein. Color bleed involves the migration of color agents between adjacent zones in a multi-colored printed image on a print medium. Color bleed substantially decreases print quality and resolution, and prevents distinct boundaries from being produced between adjacent color regions.

In a first preferred embodiment, one pen contains a gel-forming species and the other pen contains a gel-initiating species. Gelation occurs between a first composition comprising the gel-forming species and a coloring agent and a second composition comprising the gel-initiating species, with or without a coloring agent.

As an example, the first composition containing the gel-forming species and the color agent is brought into contact on a region of the print medium with the second composition having a color agent and the gel-initiating species or chemical conditions which bring about gelation. The formation of the gel on the print medium impedes the movement of the color agents between the two inks and thus reduces the color to color bleed.

Exemplary gel-forming species employed in the practice of the present invention include, but are not limited, to agar, algin, carrageenan, fucoidan, laminaran, gum arabic, corn hull gum, gum ghatti, guar gum, karaya gum, locust bean gum, pectin, dextrans, starches, carboxymethylcellulose, and polyvinyl alcohol. Many of these gel-formers are commercially available under such tradenames as Kelzon, Crodyne BY19, Kelcogel PC, Mannucol LB, Kelgin QL, Keltone LV, and Keltone HV.

Exemplary gel-initiating species employed in the practice of the present invention include, but are not limited to, (1) sodium borate, (2) typical mineral acids such as hydrochloric acid, nitric acid, phosphoric acid, sulfuric acid, phosphorous acid, and sulfurous acid, (3) typical organic acids such as acetic acid, propionic acid, benzoic acid, and phthalic acid, and (4) protonated tertiary amines such as trimethyl ammonium hydrochloride.

Exemplary coloring agents employed in the practice of the present invention include sulfonate or carboxylate water-soluble dyes, such as C.I. Acid Blue 9, C.I. Acid Red 18, C.I. Acid Red 27, C.I. Acid Red 52, C.I. Acid Yellow 23, C.I. Direct Blue 199, and C.I. Direct Yellow 86, and Food Black 2.

In this first embodiment, the gel-forming species preferably consists essentially of about 0.1 to 1 wt. % of guar gum, one or more water-soluble dyes, and the balance water and the gel-initiating species preferably consists essentially of about 0.1 to 3 wt. % of sodium borate, sufficient base to adjust the pH greater than 8, one or more watersoluble dyes, and the balance water. In these pre-ferred compositions, other substances commonly added to inks, such as biocides, and the like, which do not affect the material properties of the ink disclosed herein, may be included.

In a second preferred embodiment, one pen contains a gel-forming species and the other pen contains a gel-initiating species of sufficient acidity to bring about gelation of the gel-forming species. The gel-forming species comprises one of the gel-forming species described above, one or more water-soluble dyes, and the balance water, while the gel-initiating species may or may not include one or more water-soluble dyes, but importantly, has a pH less than 5. Preferably, the gel-forming species in this second embodiment consists essentially of about 0.1 to 1 wt. % of carboxymethylcellulose.

In a third preferred embodiment, a region of the print medium is pretreated with a gel-initiating species, having no colorants, prior to printing with a composition containing the gel-forming species and at least one colorant. The pre-treatment composition comprises about 0.01 to 10 wt. % of the gel-initiating species containing (1) ions such as calcium, magnesium, aluminum, iron, and similar ions, (2) sodium borate, (3) a mineral acid as defined above, and/or (4) an organic acid as defined above, the pre-treatment composition having sufficient acidity, to bring about gelation. The colorant-containing composition comprises about 0.01 to 10 wt. % of a gel-forming species as described above, one or more coloring agents as described above, and the balance water.

In this third embodiment, the gel-initiating species preferably consists essentially of about 0.1 to 10 wt. % of calcium ions, and a pH less than 5, while the gel-forming species preferably consists essentially of about 0.1 to 1 wt. % of sodium alginate.

In a fourth preferred embodiment, a region of the print medium is pretreated with the gel-forming species having no colorants, prior to printing with a composition containing the gel-initiating species. The pre-treatment composition comprises about 0.01 to 10 wt. % of a gel-forming species as described above. The colorant-containing composition comprises about 0.01 to 10 wt. % of a gel-initiating species as described in the third preferred embodiment and having sufficient acidity to bring about gelation, one or more colorants as described above, and the balance water.

In this fourth embodiment, as in the third embodiment, the gel-initiating species preferably consists essentially of about 0.1 to 10 wt. % of calcium ions, and a pH less than 5, while the gel-forming species preferably consists essentially of about 0.1 to 1 wt. % of sodium alginate.

Exemplary situations are provided, involving the control of color bleed between two compositions (herein-after "Composition 1" and "Composition 2"), with the preferred formulations as follows:

EXAMPLE 1

Gel-forming species in one pen and gel-initiating species in the other.

Composition 1:

Composition 1 comprises (a) about 0.01 to 10 wt. % of a gel-forming species selected from the group consisting of agar, algin, carrageenan, fucoidan, laminaran, gum arabic, corn hull gum, gum ghatti, guar gum, karaya gum, locust bean gum, pectin, dextrans, starches, carboxymethylcellulose, polyvinyl alcohol, Kelzon, Crodyne BY19, Kelcogel PC, Mannucol LB, Kelgin QL, Keltone LV, and Keltone HV, (b) one or more water-soluble dyes selected from the group consisting of C.I. Acid Blue 9, C.I. Acid Red 18, C.I. Acid Red 27, C.I. Acid Red 52, C.I. Acid Yellow 23, C.I. Direct Blue 199, C.I. Direct Yellow 86, and Food Black 2, and (c) the balance water. In a preferred embodiment, the gel-forming species consists essentially of about 0.1 to 1 wt. % of guar gum.

Composition 2:

Composition 2 comprises a gel-initiating species comprising about 0.01 to 10 wt. % of sodium borate, with sufficient base to adjust the pH greater than 8, one or more water-soluble dyes selected from the group consisting of C.I. Acid Blue 9, C.I. Acid Red 18, C.I. Acid Red 27, C.I. Acid Red 52, C.I. Acid Yellow 23, C.I. Direct Blue 199, C.I. Direct Yellow 86, and Food Black 2, and the balance water. In a preferred embodiment, the gel-initiating species consists essentially of about 0.1 to 3 wt. % of sodium borate.

EXAMPLE 2

Gel-forming species in one pen and gel-initiating species of sufficient acidity to bring about gelation of gel-forming species in the other. In a preferred embodiment, the pH of the gel-initiating species is less than 5.

Composition 1:

Composition 1 comprises (a) about 0.01 to 10 wt. % of a gel-forming species selected from the group consisting of agar, algin, carrageenan, fucoidan, laminaran, gum arabic, corn hull gum, gum ghatti, guar gum, karaya gum, locust bean gum, pectin, dextrans, starches, carboxymethylcellulose, polyvinyl alcohol, Kelzon, Crodyne BY19, Kelcogel PC, Mannucol LB, Kelgin QL, Keltone LV, and Keltone HV, (b) one or more water-soluble dyes selected from the group consisting of C.I. Acid Blue 9, C.I. Acid Red 18, C.I. Acid Red 27, C.I. Acid Red 52, C.I. Acid Yellow 23, C.I. Direct Blue 199, C.I. Direct Yellow 86, and Food Black 2, and (c) the balance water. In a preferred embodiment, the gel-forming species consists essentially of about 0.1 to 1% of carboxymethylcellulose.

Composition 2:

Composition 2 comprises (a) a gel-initiating species selected from the group consisting of sodium borate and typical mineral acids such as hydrochloric acid, nitric acid, phosphoric acid, sulfuric acid, phosphorous acid, and sulfurous acid, and typical organic acids such as acetic acid, propionic acid, benzoic acid, and phthalic acid, and protonated tertiary amines such as trimethyl ammonium hydrochloride, having sufficient acidity to bring about gelation of the gel-forming species, (b) one or more water-soluble dyes selected from the group consisting of C.I. Acid Blue 9, C.I. Acid Red 18, C.I. Acid Red 27, C.I. Acid Red 52, C.I. Acid Yellow 23, C.I. Direct Blue 199, and C.I. Direct Yellow 86, and (c) the balance water. In a preferred embodiment, the gel-initiating species has a pH less than 5.

EXAMPLE 3

Coating of paper with a gel-initiating species, having no colorant, prior to printing with an ink containing the gel-forming species.

Composition 1:

Composition 1 is a pre-treatment composition comprising 0.01 to 10 wt. % of a gel-initiating species such as (a) calcium, magnesium, aluminum, iron, and similar ions, (b) sodium borate, (c) an acid containing species such as hydrochloric acid, nitric acid, phosphoric acid, sulfuric acid, phosphorous acid, sulfurous acid, and/or (d) typical organic acids such as acetic acid, propionic acid, benzoic acid, and phthalic acid of sufficient acidity to bring about gelation. In a preferred embodiment, the gel-initiating species consists essentially of about 0.1 to 10% of calcium ions and a pH less than 5.

Composition 2:

Composition 2 comprises (a) about 0.01 to 10 wt. % of a gel-forming species selected from the group consisting of agar, algin, carrageenan, fucoidan, laminaran, gum arabic, corn hull gum, gum ghatti, guar gum, karaya gum, locust bean gum, pectin, dextrans, starches, carboxymethylcellulose, polyvinyl alcohol, Kelzon, Crodyne BY19, Kelcogel PC, Mannucol LB, Kelgin QL, Keltone LV, and Keltone HV, (b) one or more water-soluble dyes selected from the group consisting of C.I. Acid Blue 9, C.I. Acid Red 18, C.I. Acid Red 27, C.I. Acid Red 52, C.I. Acid Yellow 23, C.I. Direct Blue 199, C.I. Direct Yellow 86, Food Black 2, and (c) the balance water. In a preferred embodiment, the gel-forming species consists essentially of about 0.1 to 1% of sodium alginate.

EXAMPLE 4

Coming of paper with a gel-forming species, having no colorant, prior to printing with an ink containing the gel-initiating species.

Composition 1:

Composition 1 is a pre-treatment composition comprising about 0.01 to 10 wt. % of a gel-forming species selected from the group consisting of agar, algin, carrageenan, fucoidan, laminaran, gum arabic, corn hull gum, gum ghatti, guar gum, karaya gum, locust bean gum, pectin, dextrans, starches, carboxymethylcellulose, polyvinyl alcohol, Kelzon, Crodyne BY19, Kelcogel PC, Mannucol LB, Kelgin QL, Keltone LV, and Keltone HV. In a preferred embodiment, the gel-forming species consists essentially of about 0.1 to 1 wt. % of sodium alginate.

Composition 2:

Composition 2 comprises about 0.01 to 10 wt. % of a gel-initiating species such as (a) calcium, magnesium, aluminum, iron, and similar ions, (b) sodium borate, (c) a mineral acid such as hydrochloric acid, nitric acid, phosphoric acid, sulfuric acid, phosphorous acid. sulfurous acid, and/or (d) typical organic acids such as acetic acid, propionic acid, benzoic acid, and phthalic acid and having sufficient acidity to bring about gelation, one or more water-soluble dyes selected from the group consisting of C.I. Acid Blue 9, C.I. Acid Red 18, C.I. Acid Red 27, C.I. Acid Red 52, C.I. Acid Yellow 23, C.I. Direct Blue 199, C.I. Direct Yellow 86, Food Black 2, and the balance water. In a preferred embodiment, the gel-initi-ating species consists essentially of about 0.1 to 10 wt. % of calcium ions and a pH less than 5.

The present invention represents an advance in the art of thermal ink-jet printing technology. Use of the invention as described herein avoids color bleed problems in multi-color ink systems, thereby allowing the production of clear and distinct printed images. Having herein described preferred embodiments of the present invention, it is anticipated that suitable modifications may be made to the invention by individuals skilled in the art which nonetheless remain within the scope of the invention.

INDUSTRIAL APPLICABILITY

The compositions of the invention are expected to find use in thermal ink-jet inks, especially color inks, where bleed of one color into another is a concern. The compositions of the invention reduce or even eliminate such color bleed.

What is claimed is:

1. A method for printing multi-color images on a print medium in which color bleed between adjacent colored regions is controlled comprising the steps of:
   (a) providing two compositions, a first composition comprising a gel-forming species and a second composition comprising a gel-initiating species which is capable of reacting with said first composition in order to form a gel therefrom, provided that at least one of said two compositions includes at least one coloring agent;
   (b) applying said first composition to said print medium in a first region thereon;
   (c) applying said second composition to said print medium in a second region thereon, said second region being directly adjacent to and in contact with said first region; and
   (d) allowing said gel-initiating species in said second composition to react with said gel-forming species in said first composition at a position on said print medium where said first region comes in contact with said second region so that said gel is formed at said position in order to prevent color bleed between said first composition in said first region and said second composition in said second region.

2. The method of claim 1 wherein said gel-forming species is selected from the group consisting of agar, algin, carrageenan, fucoidan, laminaran, gum arabic, corn hull gum, gum ghatti, guar gum, karaya gum, locust bean gum, pectin, dextrans, starches, carboxymethylcellulose, and polyvinyl alcohol and wherein said gel-initiating species is selected from the group consisting of sodium borate, mineral acids, organic acids, and protonated tertiary amines.

3. The method of claim 2 wherein said mineral acids are selected from the group consisting of hydrochloric acid, nitric acid, phosphoric acid, sulfuric acid, phosphorous acid, and sulfurous acid, said organic acids are selected from the group consisting of acetic acid, propionic acid, benzoic acid, phthalic acid, and said protonated tertiary amine consists essentially of trimethyl ammonium hydrochloride.

4. The method of claim 2 wherein said first composition consists essentially of:
   (a) about 0.1 to 1 wt. % of guar gum;
   (b) at least one water-soluble dye; and
   (c) the balance water.

5. The method of claim 4 wherein said second composition consists essentially of:
   (a) about 0.1 to 3 wt. % of sodium borate;
   (b) at least one water-soluble dye;
   (c) a pH greater than 8; and
   (d) the balance water.

6. The method of claim 2 wherein said first composition consists essentially of:
   (a) about 0.1 to 1 wt. % of carboxymethylcellulose;

(b) at least one water-soluble dye; and (c) the balance water.

7. The method of claim 6 wherein said second composition consists essentially (a) a pH less than 5;

(b) at least one water-soluble dye; and (c) the balance water.

8. The method of claim 6 wherein said second composition consists essentially (a) a pH less than 5; and (b) the balance water.

9. A method for printing multi-color images on a print medium in which color bleed is controlled comprising the steps of:

(a) providing two compositions, a first composition comprising a gel-forming species and a second composition comprising a gel-initiating species which is capable of reacting with said first composition in order to form a gel therefrom, provided that one of said two compositions includes at least one coloring agent;

(b) pretreating a first region of said print medium with either said first composition or said second composition and applying the other composition to said print medium in said first region thereon;

(c) allowing said gel-initiating species in said second composition to react with said gel-forming species in said first composition at said first region of said print medium so that said gel is formed at said position in order to prevent color bleed.

10. The method of claim 9 wherein said gel-forming species is selected from the group consisting of agar, algin, carrageenan, fucoidan, laminaran, gum arabic, corn hull gum, gum ghatti, guar gum, karaya gum, locust bean gum, pectin, dextrans, starches, carboxymethylcellulose, and polyvinyl alcohol and wherein said gel-initiating species is selected from the group consisting of selected ions, sodium borate, mineral acids, organic acids, and protonated tertiary amines.

11. The method of claim 10 wherein said mineral acids are selected from the group consisting of hydrochloric acid, nitric acid, phosphoric acid, sulfuric acid, phosphorous acid, and sulfurous acid, said selected ions are selected from the group consisting of calcium, magnesium, aluminum, and iron, said organic acids are selected from the group consisting of acetic acid, propionic acid, benzoic acid, phthalic acid, and said protonated tertiary amine consists essentially of trimethyl ammonium hydrochloride.

12. The method of claim 10 wherein said first composition containing said gel-forming species is used to pretreat said first region, followed by said second composition containing said gel-initiating species.

13. The method of claim 12 wherein said second composition consists essentially of:

(a) about 0.1 to 10 wt. % calcium;

(b) a pH less than 5; and (c) the balance water, and wherein said first composition consists essentially of:

(a) about 0.1 to 1 wt. % of sodium alginate;

(b) at least one water-soluble dye; and (c) the balance water.

14. The method of claim 10 wherein said second composition containing said gel-initiating species is used to pretreat said first region, followed by said first composition containing said gel-forming species.

15. The method of claim 14 wherein said first composition consists essentially of:

(a) about 0.1 to 1.0 wt. % of guar gum;

(b) the balance water;

and wherein said second composition consists essentially of:

(a) about 0.1 to 3 wt. % of sodium borate;

(b) a pH greater than 8; and (c) at least one water-soluble dye; and (d) the balance water.

16. A thermal ink-jet ink set comprising two components, a first component comprising:

(a) about 0.1 to 1 wt. % of a gel-forming species;

(b) optionally, at least one water-soluble dye; and (c) the balance water, and a second component comprising:

(a) about 0.1 to 3 wt. % of a gel-initiating species;

(b) a pH less than 5;

(c) optionally, at least one water-soluble dye; and (d) the balance water, provided that at least one of said components includes said at least one water-soluble dye.

17. The thermal ink-jet ink set of claim 16 wherein said gel-forming species is selected from the group consisting of agar, algin, carrageenan, fucoidan, laminaran, gum arabic, corn hull gum, gum ghatti, guar gum, karaya gum, locust bean gum, pectin, dextrans, starches, and carboxymethylcellulose, and polyvinyl alcohol.

18. The thermal ink-jet ink set of claim 16 wherein said dye is a water-soluble anionic dye selected from the group consisting of C.I. Acid Blue 9, C.I. Acid Red 18, C.I. Acid Red 27, C.I. Acid Red 52. C.I. Acid Yellow 23, C.I. Direct Blue 199, C.I. Direct Yellow 86. and Food Black 2.

19. The thermal ink-jet ink set of claim 16 wherein said gel-initiating species is from the group consisting of selected ions, sodium borate, mineral acids, organic acids, and protonated tertiary amines.

20. The thermal ink-jet ink set of claim 19 wherein said mineral acids are selected from the group consisting of hydrochloric acid, nitric acid, phosphoric acid, sulfuric acid, phosphorous acid, and sulfurous acid, said selected ions are selected from the group consisting of calcium, magnesium, aluminum, and iron, said organic acids are selected from the group consisting of acetic acid, propionic acid, benzoic acid, phthalic acid, and aid protonated tertiary amine consists essentially of trimethyl ammonium hydrochloride.

\* \* \* \* \*